(12) United States Patent
Gilbert

(10) Patent No.: US 7,527,282 B2
(45) Date of Patent: May 5, 2009

(54) TRANSPORTER

(76) Inventor: Larry D. Gilbert, 1012 Windy Hill Rd., Russiaville, IN (US) 46979

( * ) Notice: Subject to any disclaimer, the term of this patent is extended or adjusted under 35 U.S.C. 154(b) by 229 days.

(21) Appl. No.: 11/805,401

(22) Filed: May 23, 2007

(65) Prior Publication Data
US 2008/0290627 A1    Nov. 27, 2008

(51) Int. Cl.
*B60D 1/54*    (2006.01)
(52) U.S. Cl. .................... 280/491.3; 414/462; 414/537; 224/504; 224/505; 224/509; 224/519; 224/924
(58) Field of Classification Search .............. 280/491.3; 414/462, 537; 224/504, 505, 509, 519, 924
See application file for complete search history.

(56) References Cited

U.S. PATENT DOCUMENTS

| 4,275,981 | A | * | 6/1981 | Bruhn ........................ 414/462 |
| 4,512,593 | A | * | 4/1985 | Ehrhardt ................... 280/460.1 |
| 4,934,894 | A | * | 6/1990 | White ......................... 414/462 |
| 5,011,361 | A | * | 4/1991 | Peterson ..................... 414/462 |
| 5,368,325 | A | * | 11/1994 | Hazen ........................ 280/656 |
| 5,462,398 | A | * | 10/1995 | Hymer ....................... 414/462 |
| 5,680,976 | A | * | 10/1997 | Koliopoulos et al. ........ 224/524 |
| 5,685,469 | A | * | 11/1997 | Stapleton .................... 224/505 |
| 5,853,278 | A | * | 12/1998 | Frantz ........................ 414/462 |
| 5,938,395 | A | * | 8/1999 | Dumont, Jr. ................ 414/462 |
| 6,626,449 | B2 | * | 9/2003 | Hazen ........................ 280/492 |
| 6,659,491 | B2 | * | 12/2003 | Green ...................... 280/423.1 |
| 6,783,315 | B1 | * | 8/2004 | Senechal .................... 414/462 |
| 6,948,732 | B2 | * | 9/2005 | Amacker ................... 280/415.1 |
| 7,188,848 | B2 | * | 3/2007 | Chapman ..................... 280/78 |
| 2008/0206030 | A1 | * | 8/2008 | Reuille et al. ............... 414/462 |

OTHER PUBLICATIONS

DiscountTrailers.Com LLC, 760 S Indiana Ave., West Bend, WI 53095 Swivel Wheel Trailers.

* cited by examiner

*Primary Examiner*—Paul N Dickson
*Assistant Examiner*—Michael R Stabley
(74) *Attorney, Agent, or Firm*—Frank D. Lachenmaier

(57) ABSTRACT

This invention relates generally to a trailer for towing light weight items such as Motorcycles, All Terrain Vehicles, Jet Skis, garden tractors, mowers, golf carts or other miscellaneous loads. The Transporter embodied in this invention takes advantage of a fixed attachment to the rear of a towing vehicle that has a hinged interface to the trailer which allows vertical motion between the trailer and the towing vehicle but eliminates the sideways motions or yaw. The Transporter also has one or more castor type wheels which allow the trailer to be backed as an extension of the towing vehicle without danger of jackknifing. The castor wheels are easily removed allowing the side of the Transporter to rest on the ground, creating a ramp to drive the vehicle to be transported onto the Transporter. The side of the Transporter can then be lifted with a typical jack and the castor wheel assembly or assemblies slipped into place and fastened. When traveling the trailer unloaded, the wheels may be removed and the trailer tilted up approximately 90 degrees about the hinge and fastened securely in its up right position, allowing for parking in conventional size parking spots. The castor wheels are easily removed allowing for easy storage of the trailer such as hanging on a garage wall.

4 Claims, 6 Drawing Sheets

Figure 1:
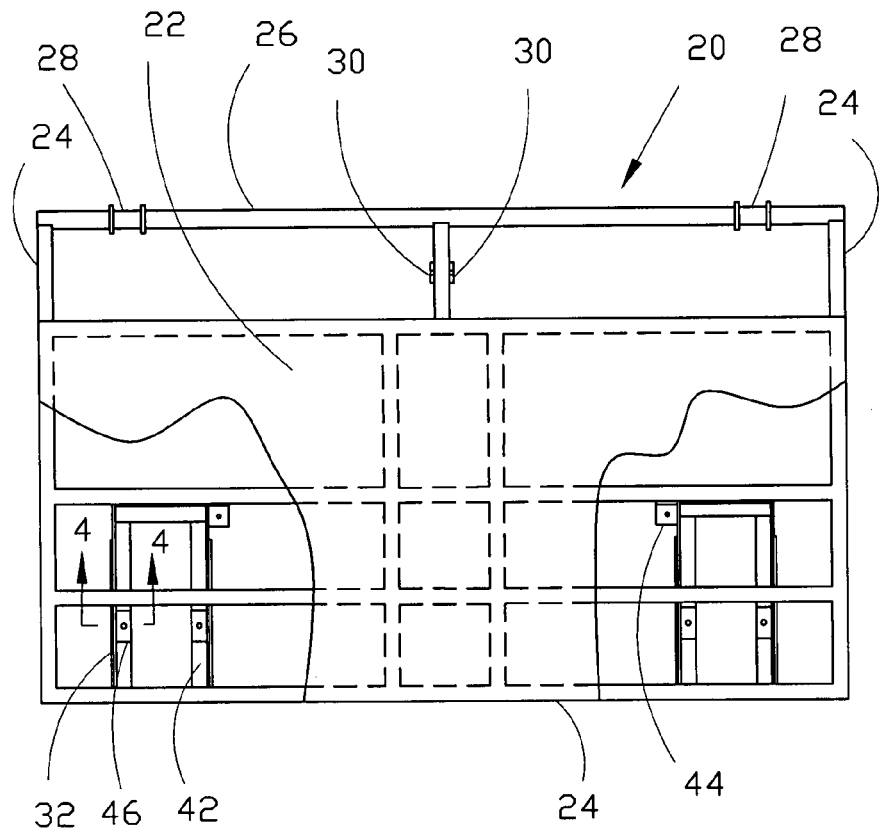

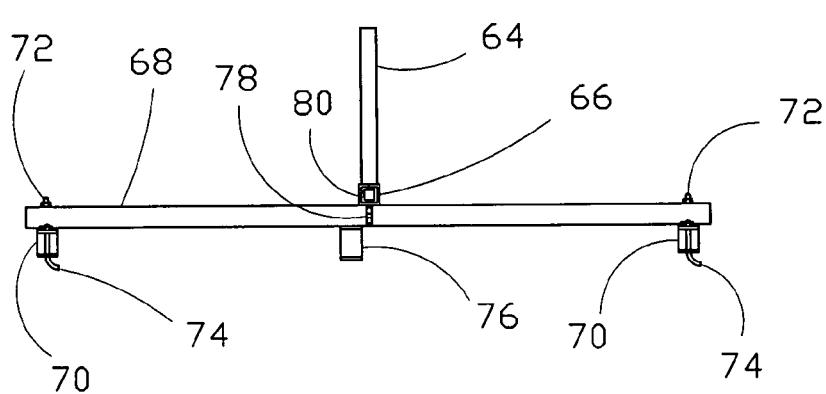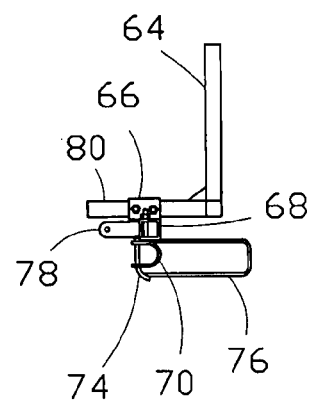
FIG. 8  FIG. 9
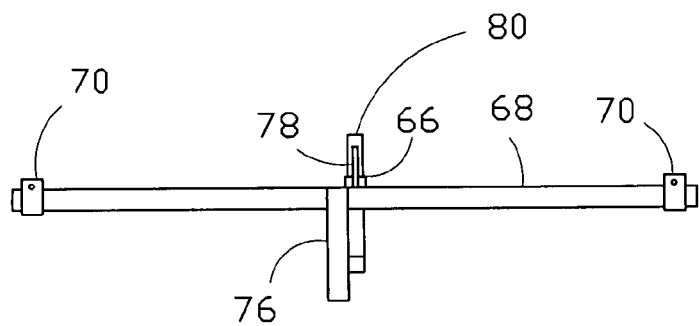
FIG. 10

TRANSPORTER

BACKGROUND

1. Field of Invention

This invention relates generally to a trailer for towing light weight items such as Motorcycles, All Terrain Vehicles, Jet Skis, garden tractors, mowers, golf carts or other miscellaneous loads.

2. Prior Art

Most small trailers are low and difficult to see when backing and very difficult to back without jackknifing. Even when not loaded, these trailers occupy an inordinate amount of storage space. It is often the case that after unloading a small vehicle trailer, the driver needs to run other errands and often has difficulty finding a parking spot of sufficient length for both the towing vehicle and the empty trailer. Castor wheel trailers with laterally fixed trailer to towing vehicle axis have been forwarded to resolve the jackknifing issue. Various complex, heavy and expensive methods have been employed to resolve the inherent high speed wobble of conventional castor wheels. Trailers have been shown that pivot upward from their hitch mechanism to allow for minimizing the required parking space for an empty trailer and improving the ride of the towing vehicle. Unfortunately, however they embody high mass wheel assemblies which are not easy to remove and makes the lifting of such trailers cumbersome and potentially dangerous in abrupt stops or frontal collisions. Some small trailers have secondary ramps for loading the trailer with a vehicle. Some are allowed to pivot about centrally located wheels when not hitched to a tow vehicle, dropping the back edge to the ground for loading. Reconnecting this type of trailer to the hitch assembly once it is loaded can be difficult.

SUMMARY

The Transporter embodied in this invention takes advantage of a fixed attachment to the rear of a towing vehicle that has a hinged interface to the trailer which allows vertical motion between the trailer and the towing vehicle but eliminates the lateral motions or yaw. The Transporter also has one or more castor type wheels which allow the trailer to be backed as an extension of the towing vehicle without danger of jackknifing or inordinate tire wear. The Transporter embodies a torsion bar drag latch mechanism that will be secured frictionally when the towing vehicle is moving forward, eliminating castor wheel shimmy.

When the load has been removed from conventional trailers, they still occupy almost the same space in a parking spot or in unloaded trailer storage as when fully loaded. The Transporter's vertical acting hinged interface allows the trailer to pivot around it, improving the ride and handling of the towing vehicle. It also allows the frame assembly to rotate 90 degrees to a vertical position and be latched, increasing the as-parked length by only approximately two feet. Removal of the quick release wheel assemblies makes the trailer light and easy to lift into the upright position. Also, removing the high mass wheel assemblies significantly reduces the danger from the torque that the frame assembly would place on the latch in a front end collision.

The Transporter is easily disassembled into its three parts (trailer frame assembly, castor wheel assembly or assemblies and the T-bar hitch assembly) for minimized floor space storage. The T-bar hitch assembly separates from the trailer frame assembly by pulling the frame pivot bar latch pins on each U-clamp and lifting the frame pivot bar out of the U-clamps. The castor wheel assembly or assemblies slip into drawer type pocket or pockets on the under side of main load frame and are retained by insertion of a retaining pin. Once separated, the components could be hung on a garage wall or taken into a motel room for storage or security.

The easy removal of one wheel Assembly and lift out of the frame pivot bar from one of the U-clamps, allows for one side of the frame assembly to be placed on the ground creating a loading ramp. The trailer frame with the load installed can then be jacked back up to the horizontal position and the pivot bar placed back into the U-clamp, the wheel assembly replaced and the retention pins reinserted.

DRAWINGS

Figure 2:
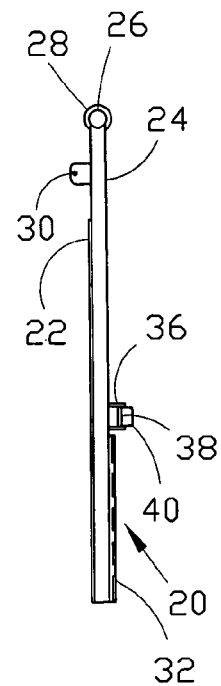
Figure 3:
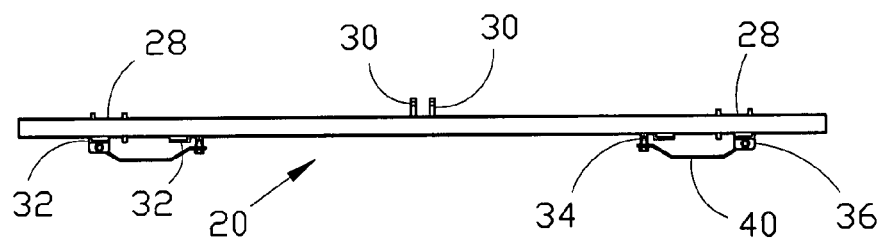
Figure 4:
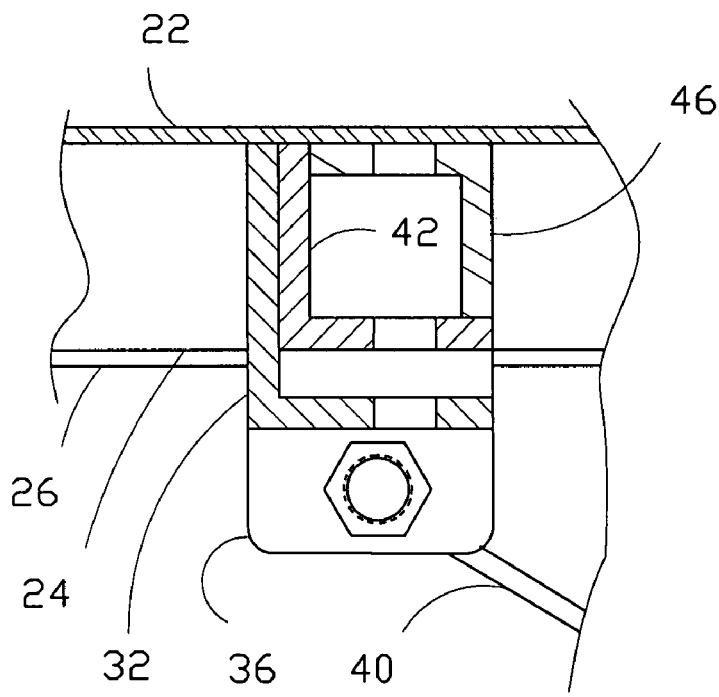
Figure 5:
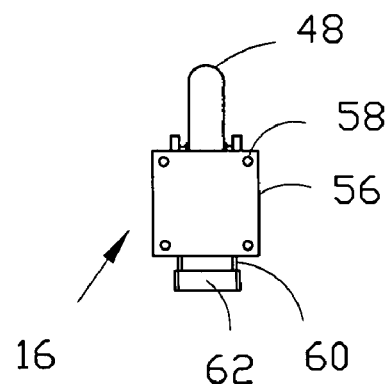
Figure 6:
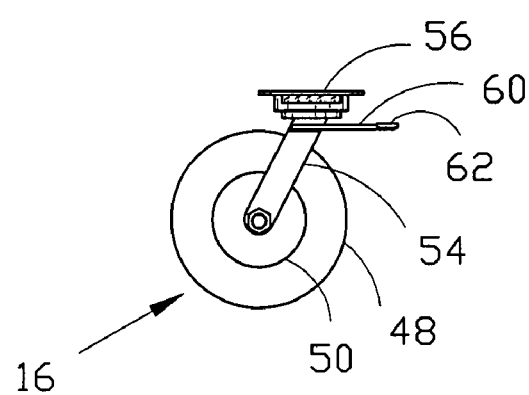
Figure 7:
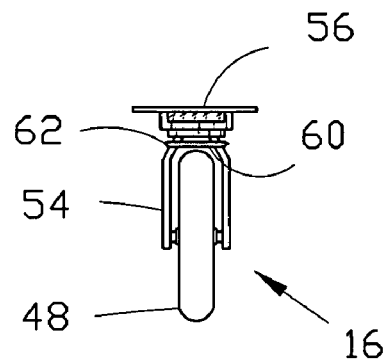
Figure 11:
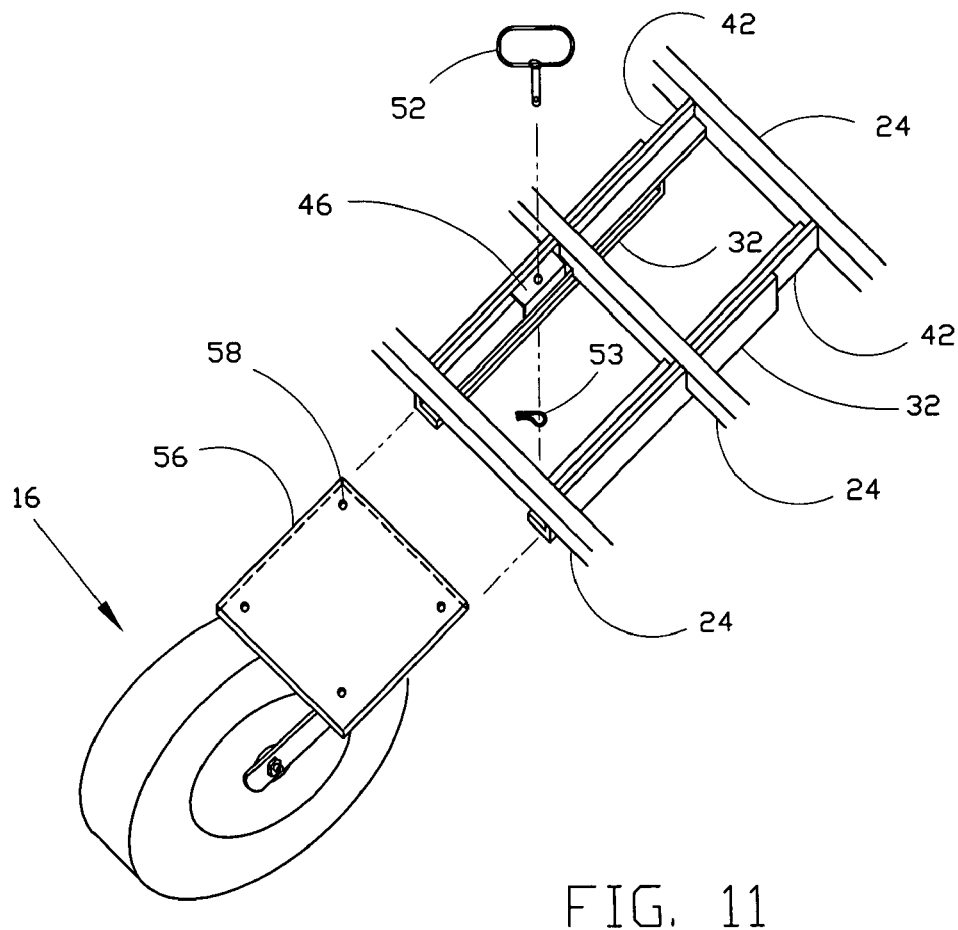
Figure 12:
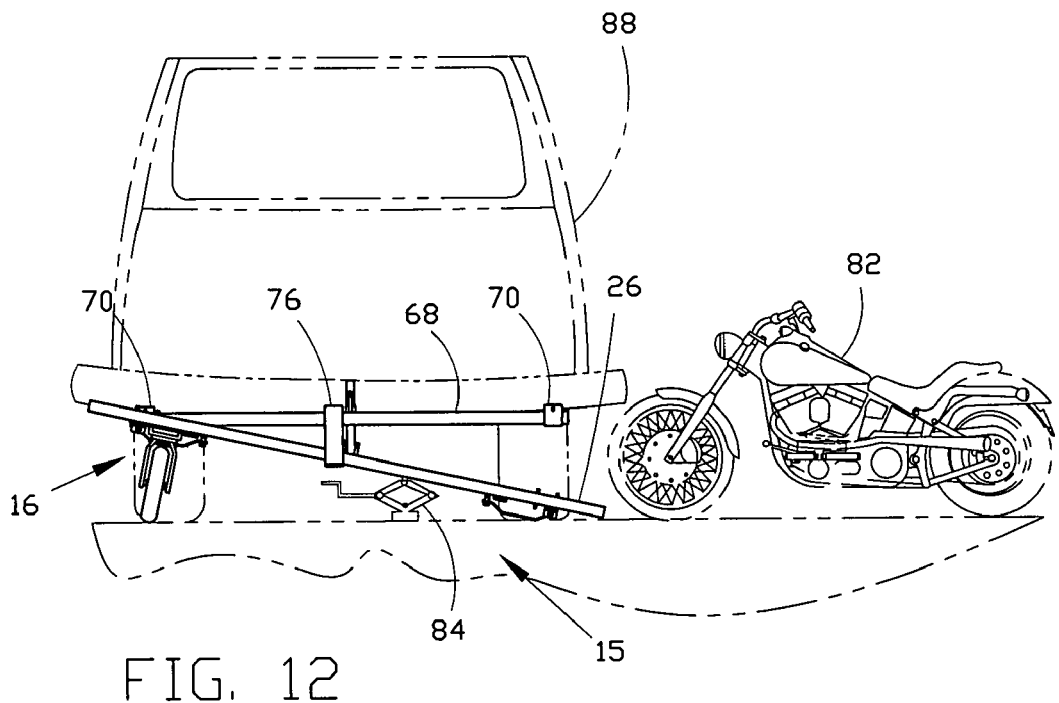
Figure 13:
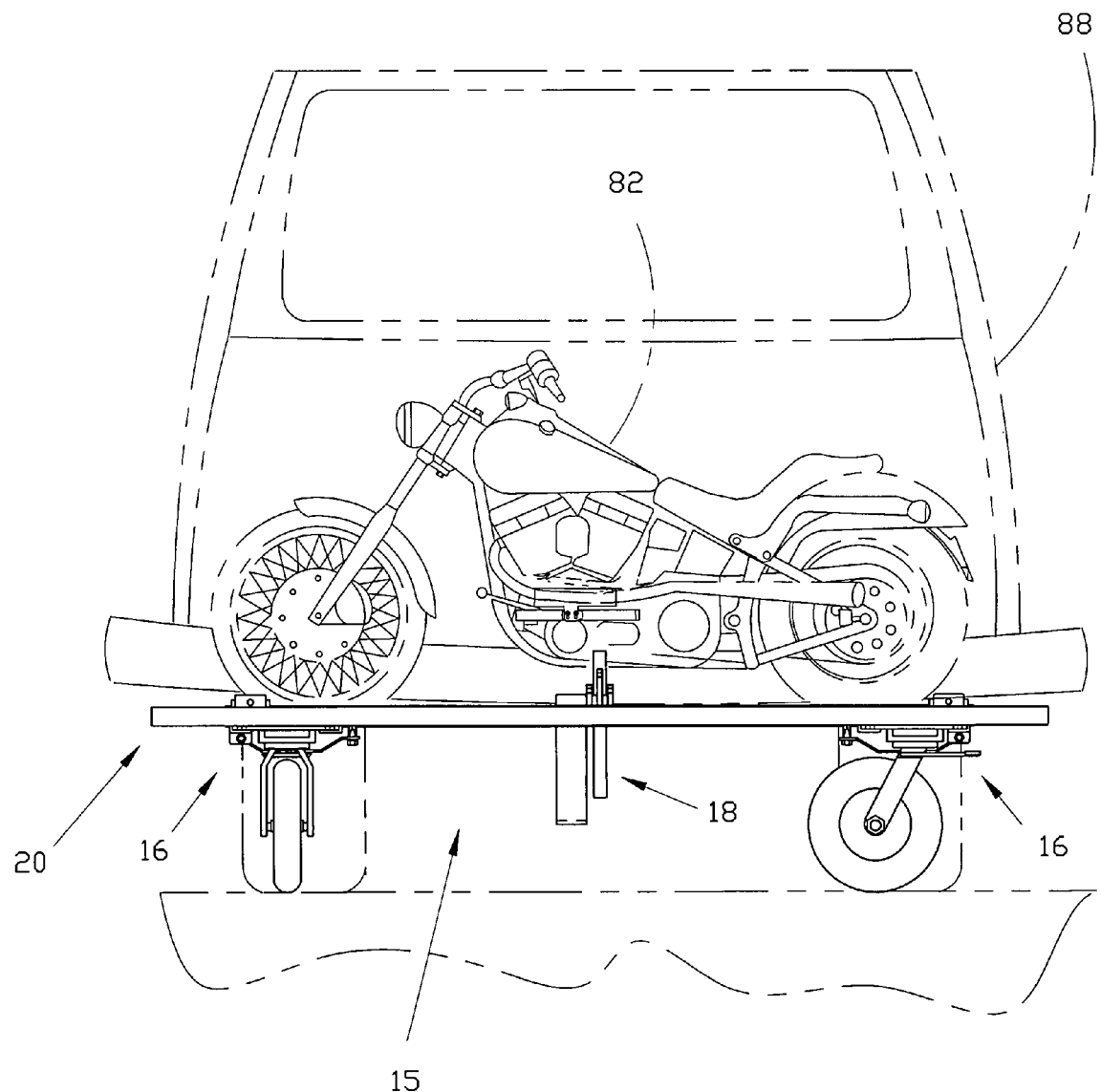
Figure 14:
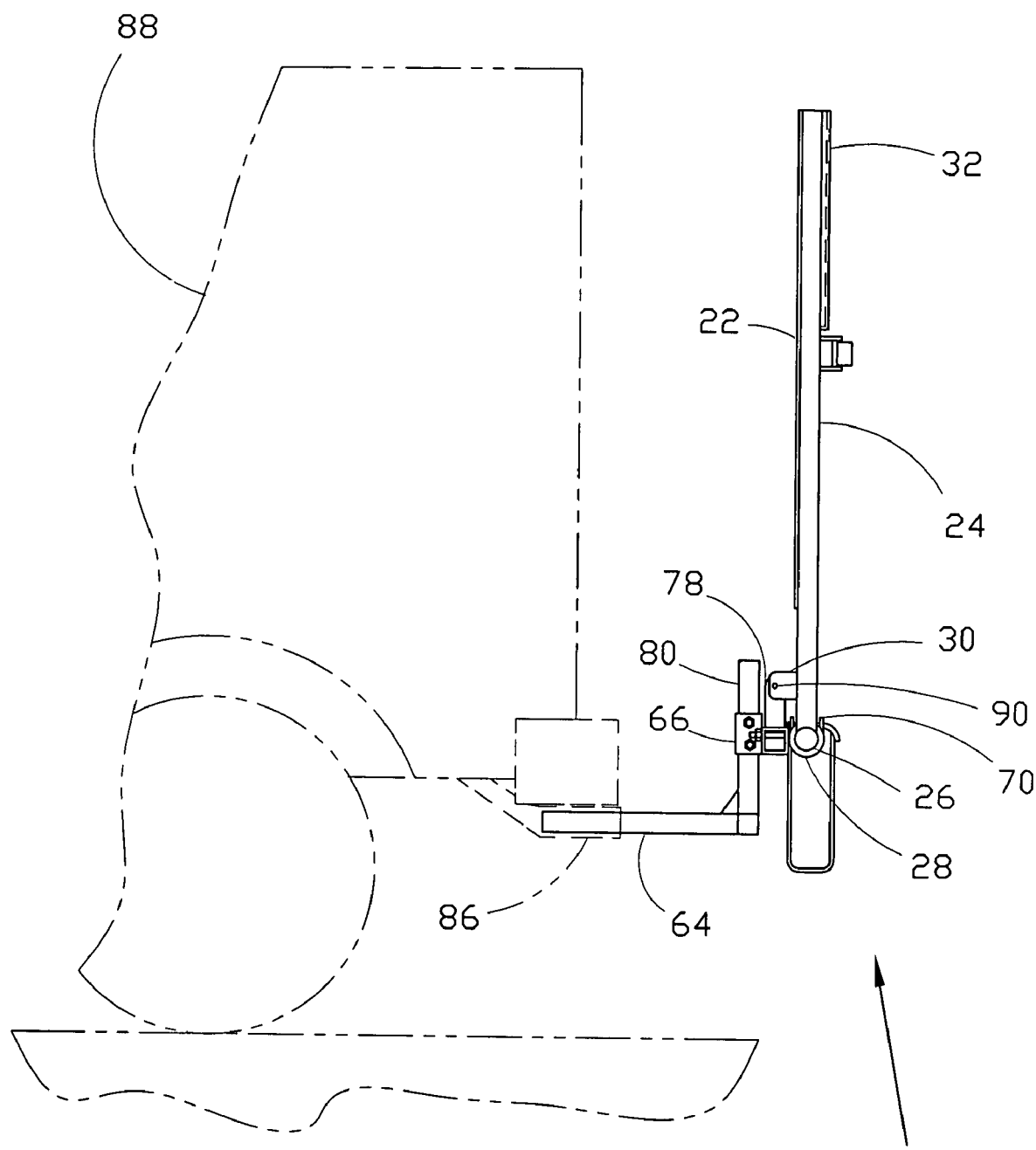

In order that the invention may be more fully understood it will now be described by way of example, with reference to the accompanying exemplary drawings in which:

FIG. 1 is a top view of the trailer frame assembly with partial sections exposing top of drawer type pocket.
FIG. 2 is a side view of the trailer frame assembly.
FIG. 3 is a rear view of the trailer frame assembly.
FIG. 4 is an enlarged view of section 4-4.
FIG. 5 is a top view of the castor wheel assembly.
FIG. 6 is a side view of the castor wheel assembly.
FIG. 7 is a front view of the castor wheel assembly.
FIG. 8 is a top view of the T-bar tongue assembly.
FIG. 9 is a side view of the T-bar tongue assembly.
FIG. 10 is a rear view of the T-bar tongue assembly.
FIG. 11 is an exploded perspective view of the castor wheel assembly drawer mount and secure arrangement.
FIG. 12 is a rear view of Transporter with the right castor wheel assembly removed, the frame assembly lifted out of the right u-clamp and the right side of frame assembly placed on ground with a motorcycle positioned at its side, ready to load.
FIG. 13 is a rear view of Transporter with a motor cycle loaded and the removed wheel assembly replaced.
FIG. 14 is a side view of Transporter attached to a towing vehicle, wheel assemblies removed and rotated up 90 degrees and latched for parking.

REFERENCE NUMERALS

The same reference numbers are used to refer to the same or similar parts in the various views.

15-Transporter
16-castor wheel assembly mounting plate
18-T-bar hitch assembly
20-trailer frame assembly retainer pin holes
22-customizable top plate
24-frame rails
26-frame pivot bar
28-bushing and caps
30-pivot latch supports
32-castor wheel mount pocket angle bottom rail support
34-torsion clutch plate spring
36-torsion clutch plate pivot mounting bolt bracket
38-torsion clutch plate pivot rod
40-torsion clutch plate
42-castor wheel mount pocket angle top rail
44-torsion clutch plate spring bracket
46-castor wheel assembly retainer bracket
48-tire
50-wheel assembly
52-plate retainer pin
53-retainer safety clips
54-castor axle assembly
56-castor wheel assembly mounting plate 58-castor wheel assembly retainer pin holes
60-torsion bar
62-torsion clutch pad
64-hitch bar
66-hitch riser bracket
68-hitch cross bar
70-U-clamp frame pivot bar support
72-U-clamp to hitch cross bar mounting bolt
74-frame pivot bar latch pin
76-loading support bracket
78-pivot latch anvil
80-hitch riser
82-vehicle or load to be transported (not part of this invention)
84-jack (not part of this invention)
86-standard towing hitch receiver (not part of this invention)
88-tow vehicle (not part of this invention)
90-parking position latch pin

DETAILED DESCRIPTION

The present invention, in its several embodiments, meets the above mentioned objectives.

An object of the present invention is to provide a Transporter 15 that is easy to back without concern for jackknifing. This is accomplished by the laterally rigid T-bar hitch assembly 18 as shown in FIGS. 8-10 which slips into standard towing receiver 86 (not part of this invention) as shown in FIG. 14 which is suspended in standard practice from the under carriage of tow vehicle 88 (not part of this invention). In essence this laterally rigid attachment to tow vehicle 88 makes Transporter 15 simply an extension of tow vehicle 88 that can be backed without concern for jackknifing, as opposed to a conventional ball trailer hitch attachment mechanism.

To make this type of extended load hauler or Transporter 15 practical in terms of tire wear requires one or more castor wheel assemblies 16 as shown in FIG. 5-7 depending on the load. Castor wheel assemblies 16 are suspended from trailer frame assembly 20 of Transporter 15 and when in the low speed and/or backup mode are allowed to pivot in the direction of motion without side-slip wear on tire or tires 48. Castor wheel assemblies 16 are not typically used on highway trailers because they shimmy at high speeds. Transporter 15 overcomes this objection with torsion bar 60 and torsion clutch pad 62 as shown in FIGS. 5-7 which constrains castor wheel assembly 16 to a forward position when towing vehicle 88 is moving forward and torsion clutch pad 62 is engaged in tension with torsion clutch plate 40 as is shown on the drivers side castor wheel assembly 16 in FIG. 13. When towing vehicle significantly changes direction of motion and friction between tire 48 and the road surface exceeds the friction between clutch pad 62 and clutch plate 40, torsion clutch pad 62 rotates out of contact with torsion clutch plate 40 and allows castor wheel assembly 16 to turn in the direction of that motion as shown in the passenger side castor wheel assembly in FIG. 13.

In order to allow extended tow vehicle 88 to ride and handle when towing a laterally rigid mounted Transporter 15, a pivoting joint is provided between T-bar hatch assembly 18 and frame assembly 20. This is accomplished by attaching U-clamp frame pivot bar supports 70 to hitch cross bar 68 towards the outer ends of hitch cross bar 68 with U-clamp to hitch cross bar mounting bolts 72. By installing bushings and caps 28 on frame pivot bar 26 at corresponding locations to aforementioned U-clamp frame pivot bar supports 70 an easy assembly is then accomplished by lowering frame pivot bar 26 into U-clamps and securing with frame pivot bar latch pins 74 and retainer safety clips 53. This pivoting joint allows Transporter 15 to pivot about the axis of frame pivot bar 26, keeping castor wheel assemblies 16 in contact with the road's irregular surface but not allowing lateral motion in a jackknife or yaw attitude.

Another object of the present invention is to provide Transporter 15 that tilts up at a 90 degree angle to the horizontal and allows parking in a conventional size parking spot. FIG. 13 illustrates this mode with castor wheel assemblies 16 optionally removed and pivot latch supports 30 on trailer frame assembly 20 connected to pivot latch anvil 78 on T-bar hitch assembly 18 with parking position latch pin 90 and retainer safety clip 53. For heavier trailers a conventional mechanical advantage winch or hydraulic lift mechanism is envisioned but not shown in the drawings for rotating trailer frame assembly 20 to this upright position.

Castor wheel assemblies 16 are designed for ease of installation and removal. Castor wheel assemblies 16 are pivotally mounted beneath castor wheel assembly mounting plates 56. Castor wheel assembly mounting plates slide into drawer like pockets on the under side of trailer frame assembly 20 as shown in FIGS. 11 and 12. Castor wheel mounting plate 56 slides between castor wheel mount pocket angle bottom rail 32 and castor wheel mount pocket angle top rail 42 from the rear of trailer frame assembly 20. It is secured in place with plate retainer pin 52 which enters from the top, through customizable top plate 22 and passes through castor wheel assembly retainer bracket 46, castor wheel mount pocket angle top rail 42, castor wheel locking pin holes 58 in castor wheel assembly mounting plate 56, and then though castor wheel mount pocket angle bottom rail 32. Standard retainer safety clips 53 are used on all the latch and locking pins as shown in FIG. 11. The quick release procedure allows castor wheel assemblies 16 to be easily removed for traveling in the upright position as shown FIG. 14. This feature allows for an easy lightening of the load, minimizing the mass extended out from the pivot point of trailer frame assembly 20 and dramatically decreasing the torque that would be applied to the parking position latch position pin 90 in a sudden acceleration or deceleration as in an emergency stop or worst case, a front end collision.

Turning to FIGS. 12 and 13, the loading operation for vehicle 82 is demonstrated. The loading operation as contemplated in FIG. 12 shows T-bar hitch assembly 18 inserted into and latched to standard towing hitch receiver 86 which is suspended from the undercarriage of tow vehicle 88. It also shows trailer frame assembly 20 with the driver side castor wheel assembly 16 installed with the drivers side U-clamp frame pivot bar support 70 holding the driver side bushing 28, with the center of frame pivot bar 26 supported with loading support bracket 76 which prevents trailer frame assembly 20 from pulling away from T-bar hitch assembly 18 while vehicle to be transported 82 is being loaded. Passenger side castor wheel assembly 16 is removed which allows the passenger side of trailer frame assembly 20 to lay on the ground making customizable top plate 22 into a loading ramp. Once vehicle to be transported 82 is in place and tied down with conventional tie down strapping, jack 84 is activated, lifting trailer frame assembly 20 back to level position and passenger side castor wheel assembly 16 is slid back in between castor wheel mount pocket angle bottom rail 32 and castor wheel mount pocket angle top rail 42 and secured with plate retainer pin 52 and retainer safety clip 53 as shown in FIG. 11 and in FIG. 13 loaded and ready for travel.

It is anticipated that the customizable top plate 22 of Transporter 15 would be as shown in above example for a motorcycle trailer but would be individually tailored to fit a Jet Ski or snowmobile sled or other small loads. Box walls are also contemplated in this invention for hauling materials such as sand, rocks, mulch, etc.

The above description is illustrative of one embodiment of this invention but does not limit it as to size, weight or particular load or number of castor wheels. Its scope is only defined by the appended claims.

What is claimed as invention is:

1. A castor wheeled trailer for laterally rigid attachment to a standard towing hitch receiver secured to a towing vehicle comprising a T-bar hitch assembly pivotally attached to a trailer frame assembly with castor wheel assemblies removably suspended therefrom;
   a) where said T-bar hitch assembly is comprised of:
      a hitch bar and riser assembly with an adjustable hitch riser bracket slidably attached whereby alignment adjustments between said towing hitch receiver and T-bar hitch assembly can be made as required;
      a hitch cross bar attached to the rear side of said hitch riser bracket; with
      U-clamp supports attached to the rear of said hitch cross bar;
   b) where said trailer frame assembly is comprised of:
      a rectangular frame assembly of square frame rails and a round frame pivot bar as the front rail of said frame assembly with bushing material and caps located on said frame pivot bar at the appropriate locations as to align with said U-clamp supports attached to said hitch cross bar;
      a customizable top plate that is configured to secure a load chosen from the group of motorcycles, golf carts, ATV's, garden tractors, mowers, snow mobiles, jet skis or a box for sand, rocks, or mulch mounted to the top of said rectangular frame assembly;
      and spring loaded clutch plates suspended from the under side of said trailer frame assembly located as to engage a torsion clutch pad mounted to a torsion bar attached to said castor wheel assembly when it is facing directly forward;
   c) where said castor wheel assembly is comprised of:
      a heavy duty castor wheel assembly pivotally attached to the under side of
      a castor wheel assembly mounting plate;
      a torsion bar attached to said castor wheel assembly; and
      a torsion clutch pad attached to the top side of the distal end of said torsion bar in such a position that when said castor wheel assembly is facing directly forward, said torsion clutch pad is in spring loaded frictional contact with said torsion clutch plate, whereby high speed shimmy is eliminated.

2. A castor wheeled trailer for laterally rigid attachment to a standard towing hitch receiver secured to a towing vehicle as in claim 1 further comprising:
   a latch mechanism comprised of pivot latch supports upstanding from the center frame rail in such a position as to interface with pivot latch anvil mounted to the top center of hitch cross bar when said trailer is pivoted to a vertical position and is fastened securely in its upright position by inserting parking position latch pin through pivot supports and pivot anvil and securing with retainer safety clip whereby vehicle with said trailer attached may park in a space with approximately 2 feet more clearance.

3. A castor wheeled trailer for laterally rigid attachment to a standard towing hitch receiver secured to a towing vehicle as in claim 1 whereby
   said castor wheel assembly or assemblies slide in and out of pockets suspended from said trailer frame assembly and are retained with quick release plate retainer pins and retainer safety clips; and
   said trailer frame assembly is easily removable from said T-bar hitch assembly by pulling retainer safety clips and frame pivot bar latch pins and lifting said frame pivot bar from said U-clamp supports whereby separated components are storable on a garage wall or at least, occupy minimum floor space.

4. A castor wheeled trailer for laterally rigid attachment to a standard towing hitch receiver secured to a towing vehicle as in claim 1 further comprising a U-shaped loading support bracket attached to the approximate rear center of said hitch cross bar whereby when one wheel assembly is removed and said frame pivot bar is lifted from said U-clamp frame pivot bar support on the side of said T-bar hitch assembly that said wheel assembly was removed from and lowered into said loading support bracket, the side of said trailer frame assembly is placed on the ground forming a loading ramp allowing various loads to be driven on to said customizable top plate, secured and then lifted back to travel position with a lift device such as a scissor jack (not part of this invention), said removed castor wheel assembly replaced and said plate retainer pin reinserted and secured with said retainer safety clip and frame pivot bar latch pin and retainer safety clip replaced and said lift device removed.

* * * * *